(12) United States Patent
Ko et al.

(10) Patent No.: US 11,480,857 B2
(45) Date of Patent: Oct. 25, 2022

(54) ADJUSTABLE OPTICAL MODULE AND PROJECTOR

(71) Applicant: Coretronic Corporation, Hsin-Chu (TW)

(72) Inventors: Tung-Yi Ko, Hsin-Chu (TW); Hsiang-Hua Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/482,423

(22) Filed: Sep. 23, 2021

(65) Prior Publication Data

US 2022/0100063 A1    Mar. 31, 2022

(30) Foreign Application Priority Data

Sep. 29, 2020 (CN) .......................... 202022184205.3

(51) Int. Cl.
*G03B 21/00* (2006.01)
*G03B 21/14* (2006.01)

(52) U.S. Cl.
CPC ......... *G03B 21/142* (2013.01); *G03B 21/006* (2013.01); *G03B 21/145* (2013.01)

(58) Field of Classification Search
CPC .... G03B 21/00; G03B 21/14; G03B 21/2073; G03B 21/142; G03B 21/145; G03B 21/006; G02B 5/30; G02B 5/3025; G02B 5/3033; G02B 5/0056; G02B 5/02285
USPC .......................................................... 353/20
See application file for complete search history.

(56) References Cited

U.S. PATENT DOCUMENTS 9,835,936 B2 * 12/2017 Natsume .............. G03B 21/006
2021/0216002 A1 * 7/2021 Tomaru ................ G03B 21/006

FOREIGN PATENT DOCUMENTS

| CN | 1727986 | 2/2006 |
|---|---|---|
| CN | 101063739 | 10/2007 |
| CN | 101067711 | 11/2007 |
| CN | 100526971 | 8/2009 |
| CN | 104348076 | 2/2015 |
| TW | I287643 | 10/2007 |
| TW | 200933281 | 8/2009 |

* cited by examiner

*Primary Examiner* — William C. Dowling
(74) *Attorney, Agent, or Firm* — JCIPRNET

(57) ABSTRACT

An adjustable optical module including a housing, an optical component and a cover component is provided. The housing has a positioning slot and an opening. The optical component is rotatably disposed on the positioning slot and includes an optical film and a carrying base for carrying the optical film. The carrying base includes an adjusting lever corresponding to the opening, and the adjusting lever is adapted to adjust an angle of the optical film. The cover component is fixed on the housing and covers the opening, and the cover component presses against the adjusting lever to fix the optical film. A projector having the adjustable optical module described above is also provided. The adjustable optical module and the projector of the invention can adjust the angle of the optical film through the above structures.

24 Claims, 10 Drawing Sheets

ADJUSTABLE OPTICAL MODULE AND PROJECTOR

CROSS-REFERENCE TO RELATED APPLICATION

This application claims the priority benefit of Taiwan application serial no. 202022184205.3, filed on Sep. 29, 2020. The entirety of the above-mentioned patent application is hereby incorporated by reference herein and made a part of this specification.

BACKGROUND

1. Field of the Invention

The invention relates to an optical module and a projector, and more particularly, relates to an adjustable optical module and a projector.

2. Description of Related Art

In general, a projection beam of a projector with a liquid crystal on silicon (LCoS) and a liquid crystal display (LCD) is prone to the problem that the brightness and contrast cannot reach the preset efficiency. Due to the characteristics of the liquid crystal on silicon, after light passes through a polarized beam splitter (PBS) to the liquid crystal on silicon and is reflected by the liquid crystal on silicon to exit the polarizing beam splitter, a polarization direction of the light reflected by the liquid crystal on silicon cannot be completely consistent. Consequently, the reflected light is unstable, resulting in insufficient brightness and contrast. At present, in order to find the best brightness and contrast, compensation films are used to correct the phenomenon that the polarization direction of the light generated by the liquid crystal on silicon is not completely consistent.

The current compensation film fixes the relative position between the compensation film and the projector after being installed in the projector, and cannot adjust the polarization direction. Due to the influence of the manufacturing tolerances of the parts, the contrast and brightness of the projection beam may be unstable.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an adjustable optical module in which an angle of an optical film can be adjusted.

The invention provides a projector having the adjustable optical module described above.

An adjustable optical module of the invention includes a housing, an optical component and a cover component. The housing has a positioning slot and an opening. The optical component is rotatably disposed on the positioning slot and includes an optical film and a carrying base for carrying the optical film. The carrying base includes an adjusting lever corresponding to the opening, and the adjusting lever is adapted to adjust an angle of the optical film. The cover component is fixed on the housing and covers the opening, and the cover component presses against the adjusting lever to fix the optical film.

A projector of the invention includes a polarized beam splitter, a liquid crystal on silicon and an adjustable optical module described above. The adjustable optical module is disposed between the polarized beam splitter and the liquid crystal on silicon.

Based on the above, the optical component of the adjustable optical module of the invention is rotatably disposed in the positioning slot of the housing, and the carrying base of the optical component includes the adjusting lever corresponding to the opening of the housing. The operator can turn the adjusting lever to adjust the angle of the optical film so that the angle of the optical film can meet the requirements. In addition, after the angle of the optical film is adjusted, the cover component presses against the adjusting lever to fix the optical film so the optical film can be maintained at a specific angle. As a result, the adjustable optical module of the invention can allow the passed light to have better optical effects.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
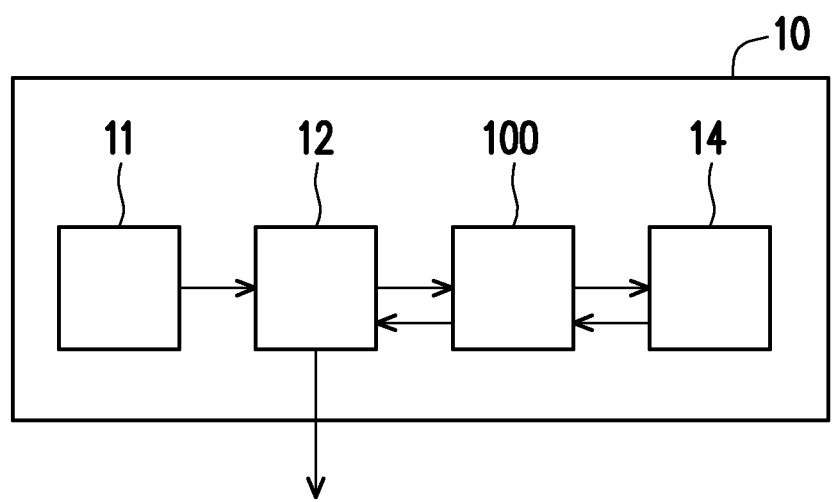
FIG. 1 is a schematic view of a projector according to embodiment of the invention.

FIG. 1 is a schematic view of a projector according to embodiment of the invention. Referring to FIG. 1, a projector 10 of the present embodiment includes a light source 11, a polarized beam splitter 12, a liquid crystal on silicon 14 and an adjustable optical module 100. The adjustable optical module 100 is disposed between the polarized beam splitter 12 and the liquid crystal on silicon 14. After the light emitted by the light source 11 passes through the polarized beam splitter 12 and the adjustable optical module 100 to the liquid crystal on silicon 14, the light is reflected by the liquid crystal on silicon 14 and then passes through the adjustable optical module 100 and the polarized beam splitter 12 again to exit in another direction.

The adjustable optical module 100 has an optical film 122 (FIG. 3A) for allowing the polarization direction of the light finally leaving the polarized beam splitter 12 to be consistent so as to provide a good optical performance. It is worth noting that, in this embodiment, the adjustable optical module 100 can adjust an angle of the optical film 122 according to tolerances between different components to ensure that the polarization direction of the light leaving the polarized beam splitter 12 can be consistent. The adjustable optical module 100 will be described in detail as follows.

Figure 2:
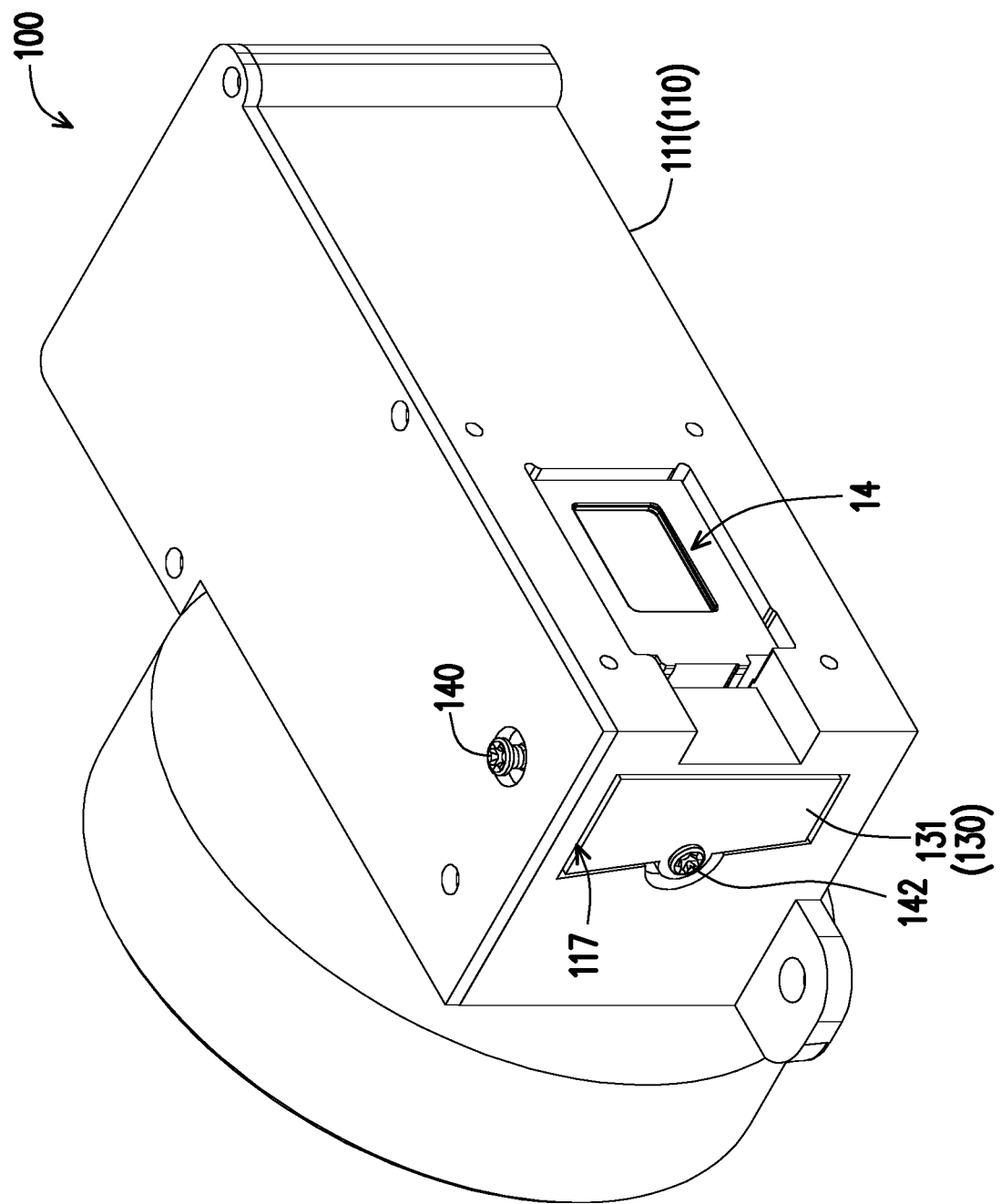
FIG. 2 is a schematic view of an adjustable optical module according to an embodiment of the invention.
Figure 3A:
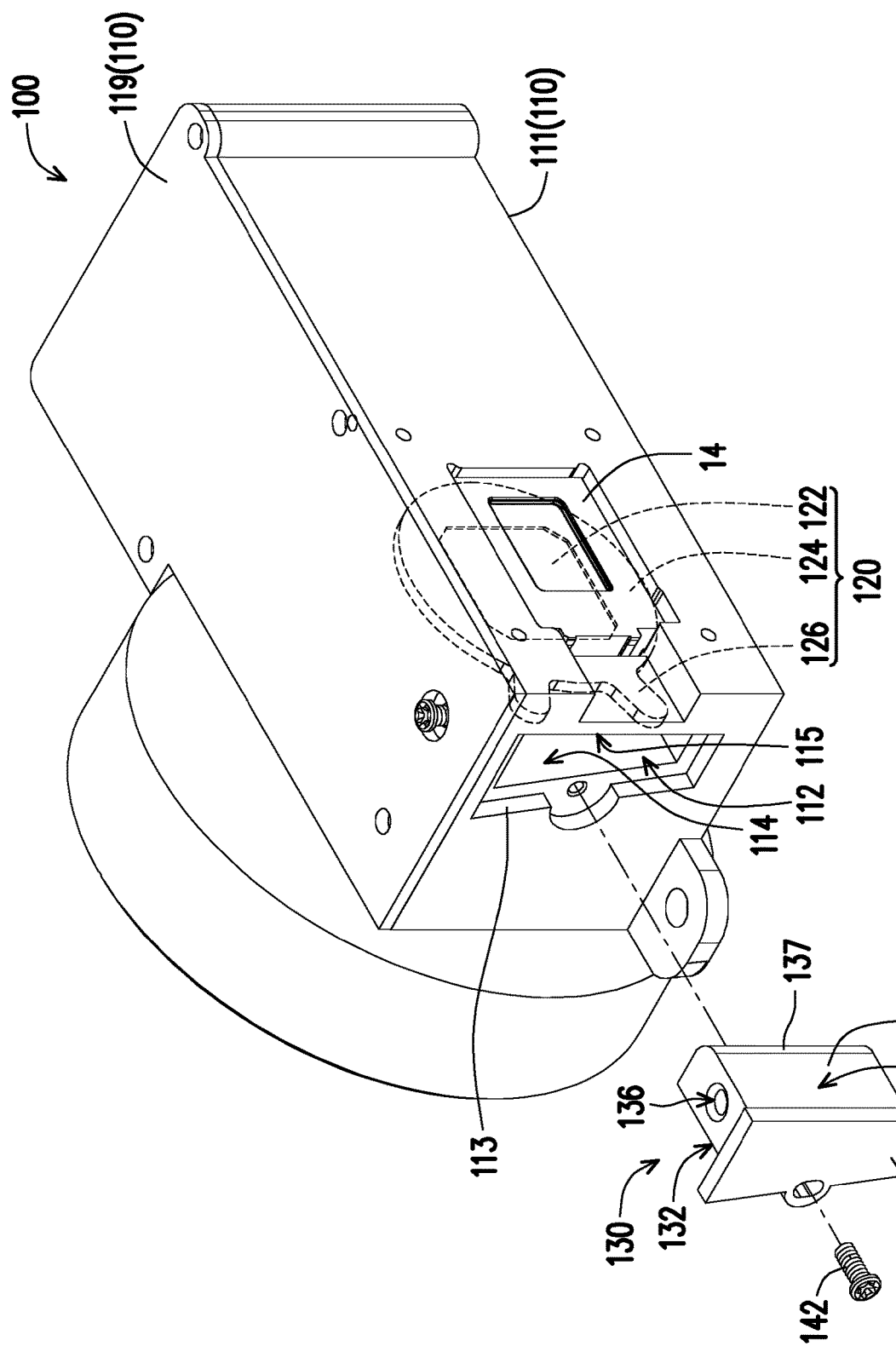
FIG. 3A is a schematic view of removing the cover component of the adjustable optical module of FIG. 2.
Figure 3B:
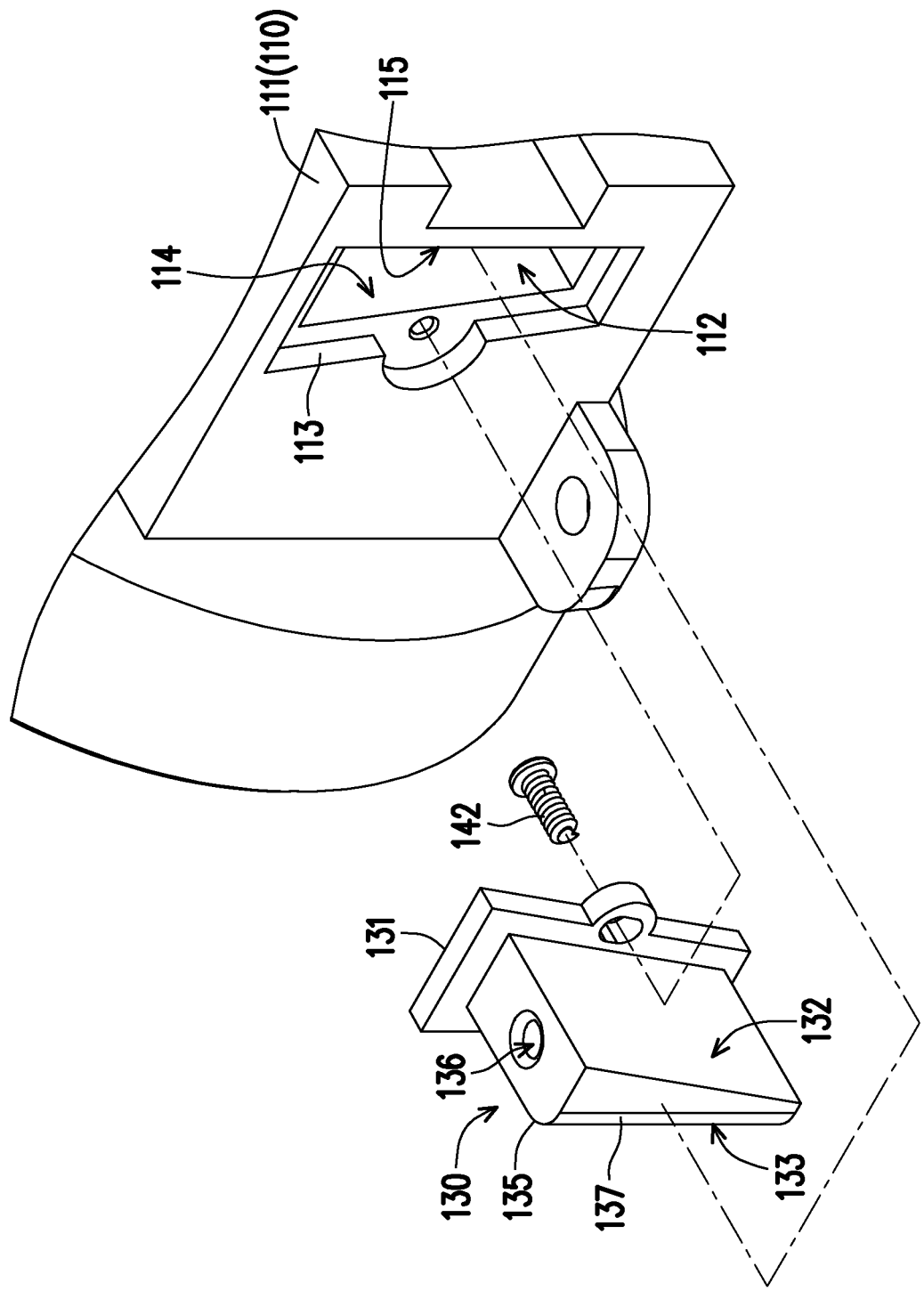
FIG. 3B is a partial schematic view of the cover component of FIG. 3A rotated 180 degrees.
Figure 4:
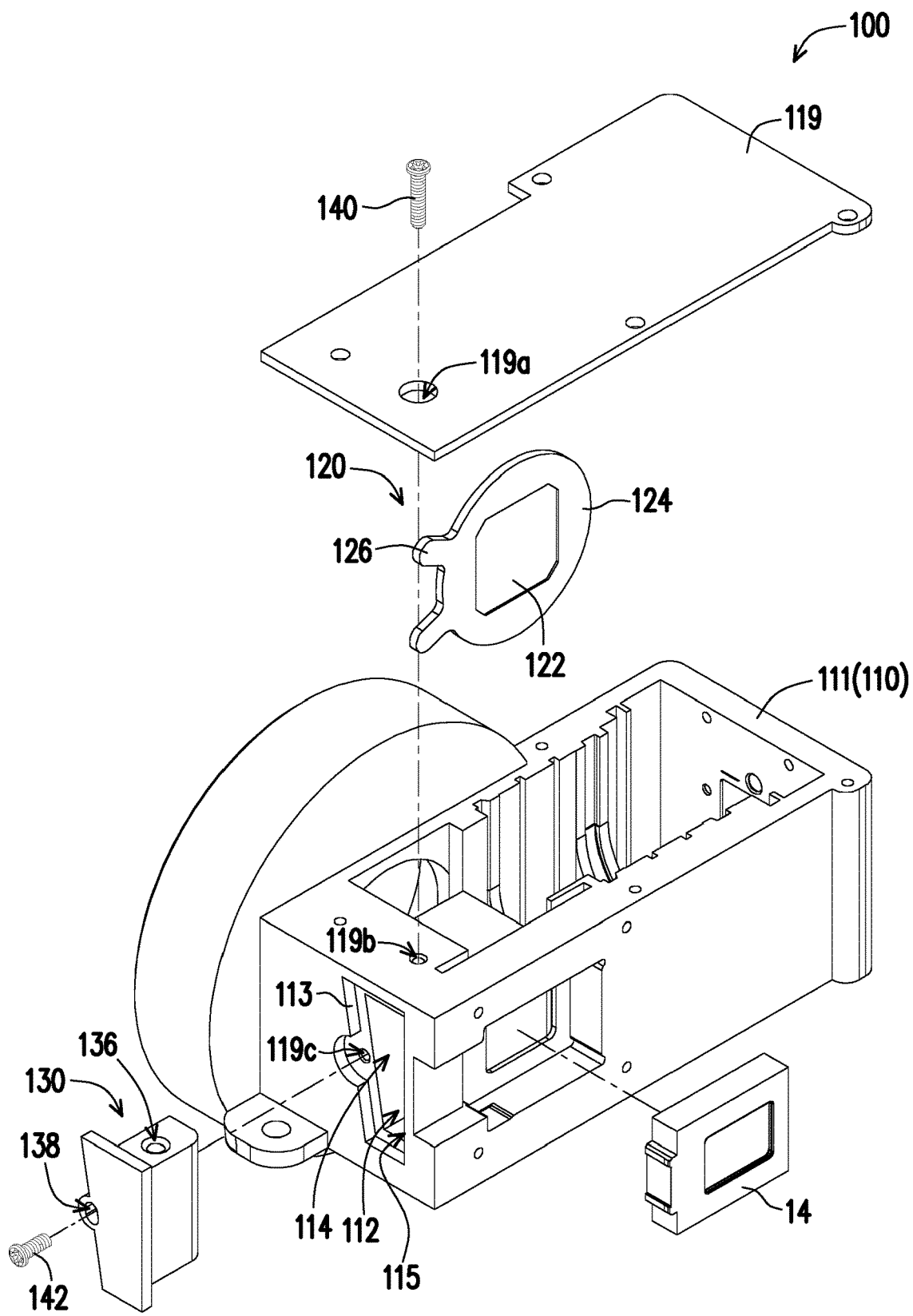
FIG. 4 is an exploded view of the adjustable optical module of FIG. 2.
Figure 5:
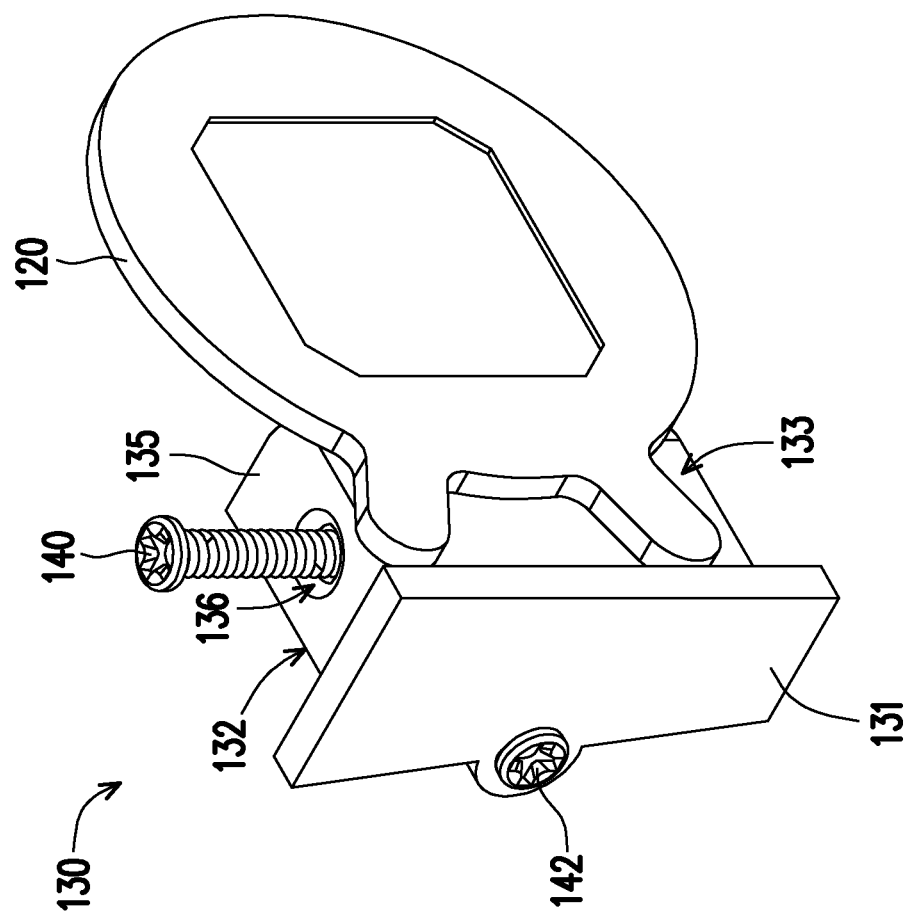
FIG. 5 is a schematic view of the optical component of the adjustable optical module of FIG. 2 being clamped by a part of the housing and the cover component.
Figure 6:
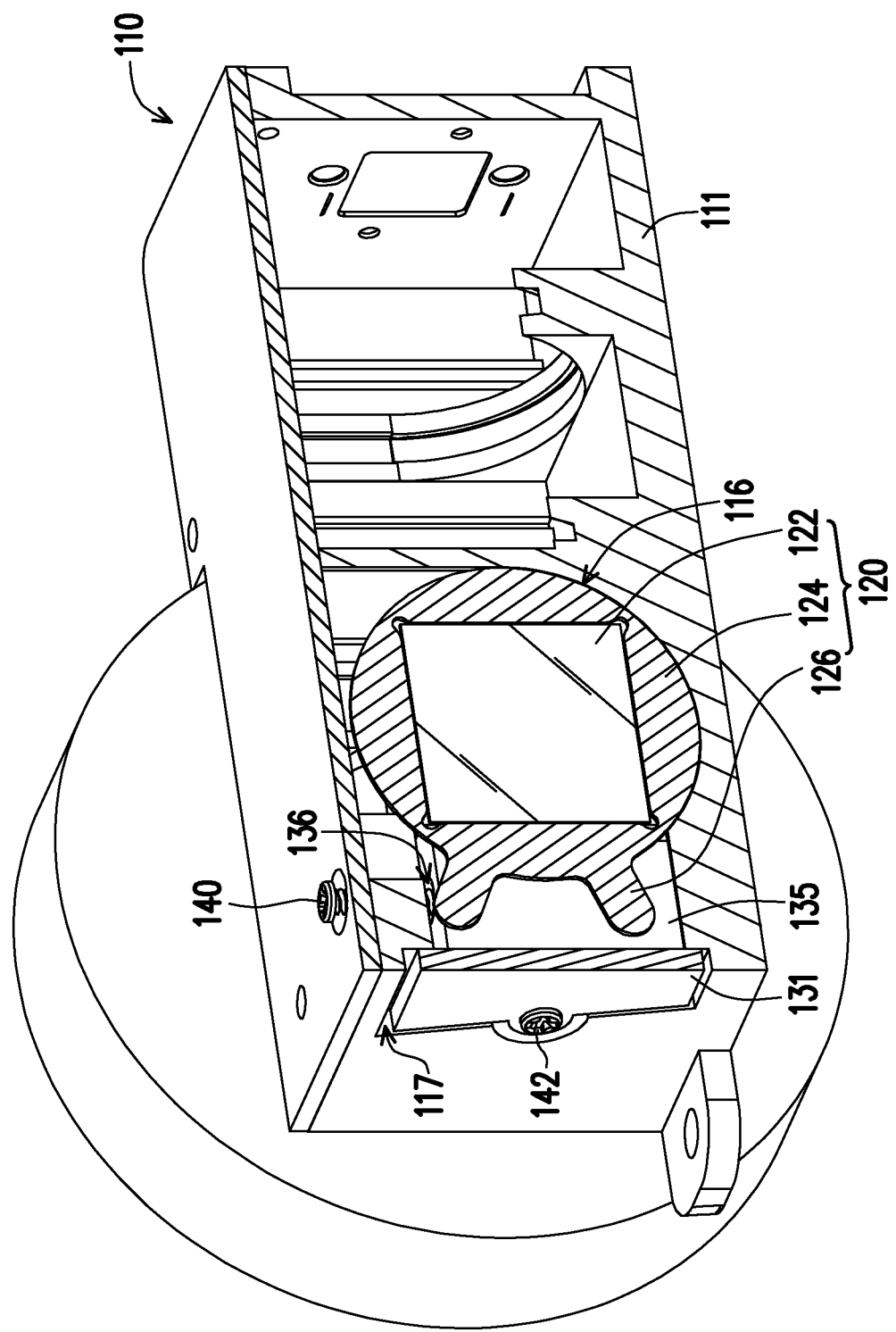
FIG. 6 is a cross-sectional view of the adjustable optical module of FIG. 2.

FIG. 2 is a schematic view of an adjustable optical module according to an embodiment of the invention. FIG. 3A is a schematic view of removing the cover component of the adjustable optical module of FIG. 2. FIG. 3B is a partial schematic view of the cover component of FIG. 3A rotated 180 degrees. FIG. 4 is an exploded view of the adjustable optical module of FIG. 2. FIG. 5 is a schematic view of the optical component of the adjustable optical module of FIG. 2 being clamped by a part of the housing and the cover component. FIG. 6 is a cross-sectional view of the adjustable optical module of FIG. 2.

Referring to FIG. 2 to FIG. 6, the adjustable optical module 100 of this embodiment includes a housing 110, an optical component 120 (FIG. 3A) and a cover component 130. The housing 110 includes a main body 111, a positioning slot 116 (FIG. 6) located inside the main body 111 and an opening 112 exposed in the main body 111.

The optical component 120 is detachably disposed in the positioning slot 116 (FIG. 6). In this embodiment, the positioning slot 116 is an arc slot, and the optical component 120 is rotatably disposed in the positioning slot 116. The optical component 120 includes an optical film 122 and a carrying base 124 for carrying the optical film 122. In this embodiment, the optical film 122 includes a compensation film, but the type of the optical film 122 is not limited thereto.

Further, in this embodiment, the shape of the optical film 122 is, for example, a square, which is convenient and inexpensive to manufacture. The carrying base 124 has an arc-shaped outer contour to facilitate rotation. The carrying base 124 includes an adjusting lever 126 corresponding to the opening 112, and the adjusting lever 126 protrudes from an arc contour and is adapted to adjust the angle of the optical film 122. Therefore, during assembly, the operator can turn the adjusting lever 126 to adjust the angle of the optical film 122 so the angle of the optical film 122 can meet the requirements.

The cover component 130 is fixed on the housing 110 and covers the opening 112. The cover component 130 includes a cover plate 131 and a pressing portion 135 protruding from the cover plate 131. The cover plate 131 is adapted to cover the opening 112. The pressing portion 135 can enter the opening 112 and presses against the adjusting lever 126 to fix the optical film 122 so the optical film 122 can be maintained at a specific angle. Accordingly, the operator does not need to use adhesive materials such as a UV glue to fix the optical film 122. Thus, the risk of glue overflow can be avoided, and the assembly is relatively simple to rework. In addition, the cover component 130 can also achieve a dustproof effect.

Specifically, in this embodiment, the housing 110 includes a wedge-shaped frame 113, and the opening 112 is located in the wedge-shaped frame 113. An inner sidewall of the opening 112 has a first inclined surface 114 and a first vertical surface 115 opposite to the first inclined surface 114. In addition, the cover plate 131 and the pressing portion 135 are wedge-shaped, and the pressing portion 135 has a second inclined surface 132 corresponding to the first inclined surface 114 and a second vertical surface 133 opposite to the second inclined surface 132. The cover plate 131 is fixed on the wedge-shaped frame 113 and covers the opening 112.

A size of the wedge-shaped frame 113 is greater than a size of the cover plate 131. In this embodiment, when the position of the optical component 120 is adjusted and the wedge-shaped frame 113 is to be covered by the cover plate 131 so the pressing portion 135 can enter the opening 112 to fix the optical component 120 as shown in FIG. 3A to FIG. 2, the cover component 130 will be installed on the housing 110 along an axis direction of the housing 110. During such a process, since a size of the opening 112 is greater than a size of the pressing portion 135, the assembler can first align the pressing portion 135 with the inner sidewall of the opening 112 at a top end of the first inclined surface 114 (an upper-left corner of the inner sidewall of the opening 112). At this time, the second vertical surface 133 of the pressing portion 135 has not yet contacted the first vertical surface 115 of the inner sidewall of the opening 112.

Next, the second inclined surface 132 of the pressing portion 135 is then moved downwardly along the first inclined surface 114 of the inner sidewall of the opening 112 so the second vertical surface 133 of the pressing portion 135 is gradually close to the first vertical surface 115 of the inner sidewall of the opening 112. Then, as shown in FIG. 2, a periphery of the cover plate 131 and the wedge frame 113 are not adjacent to each other and there is a gap 117 in between. During the process of moving the pressing portion 135 from the upper left to the lower right, the pressing portion 135 is moved toward the lower right and gradually close to the adjusting lever 126 until the adjusting lever 126 is pressed so the optical component 120 is clamped and fixed by the pressing portion 135 and the housing 110.

In addition, as shown in FIG. 3A, the pressing portion 135 has an arc chamfer 137. During a process of installing the cover component 130 to the housing 110, the arc chamfer 137 of the pressing portion 135 will first approach the optical component 120. The design of the arc chamfer 137 can reduce the risk of displacement of the optical component 120 caused by the pressing portion 135 being directly pushed to the optical component 120 when approaching the optical component 120.

Further, in this embodiment, the adjustable optical module 100 further includes at least one fixing piece (140, 142) adapted to fix the cover component 130 to the housing 110. Specifically, the housing 110 has a top plate 119, and a concave hole 136 is provided on a top surface of the pressing portion 135 of the cover component 130. After passing through a through hole 119a of the top plate 119, the fixing piece 140 is screwed into a screw hole 119b of the housing 110, penetrates the screw hole 119b, and enters the concave hole 136 (FIG. 3A) of the pressing portion 135 to press against the pressing portion 135 of the cover component 130 so the cover component 130 will not move up relative to the housing 110 along the first inclined surface 114 in the inner sidewall of the opening 112 due to vibration or the like.

Naturally, in other embodiments, it is also possible that the pressing portion 135 of the cover component 130 does not have the concave hole 136 at the position corresponding to the fixing piece 140. In that case, after being screwed and penetrating the screw hole 119b of the housing 110, the fixing piece 140 will directly press against the top surface of the pressing portion 135 of the cover component 130.

In addition, the fixing piece 142 is inserted to the cover plate 131 of the cover component 130 and screwed into the housing 110. Specifically, the cover plate 131 of the cover component 130 has a through hole 138, and the housing 110 has a corresponding screw hole 119c. The fixing piece 142 is inserted to the through hole 138 and screwed into the screw hole 119c so the cover component 130 is fixed to the housing 110 in a lateral direction.

It is worth noting that, since the second inclined surface 132 of the pressing portion 135 abuts against the first inclined surface 114 of the inner sidewall of the opening 112, during the process of screwing and locking the fixing pieces 140 and 142, the cover component 130 will be provided with a downward force. At this time, the first inclined surface 114 of the inner sidewall of the opening 112 can provide the pressing portion 135 an upward component of reaction force to support the pressing portion 135 so the cover component 130 can maintain its position without being pushed down by the screwed fixing piece 140 and 142. Accordingly, the position of the optical component 120 cannot be affected.

Figure 7:
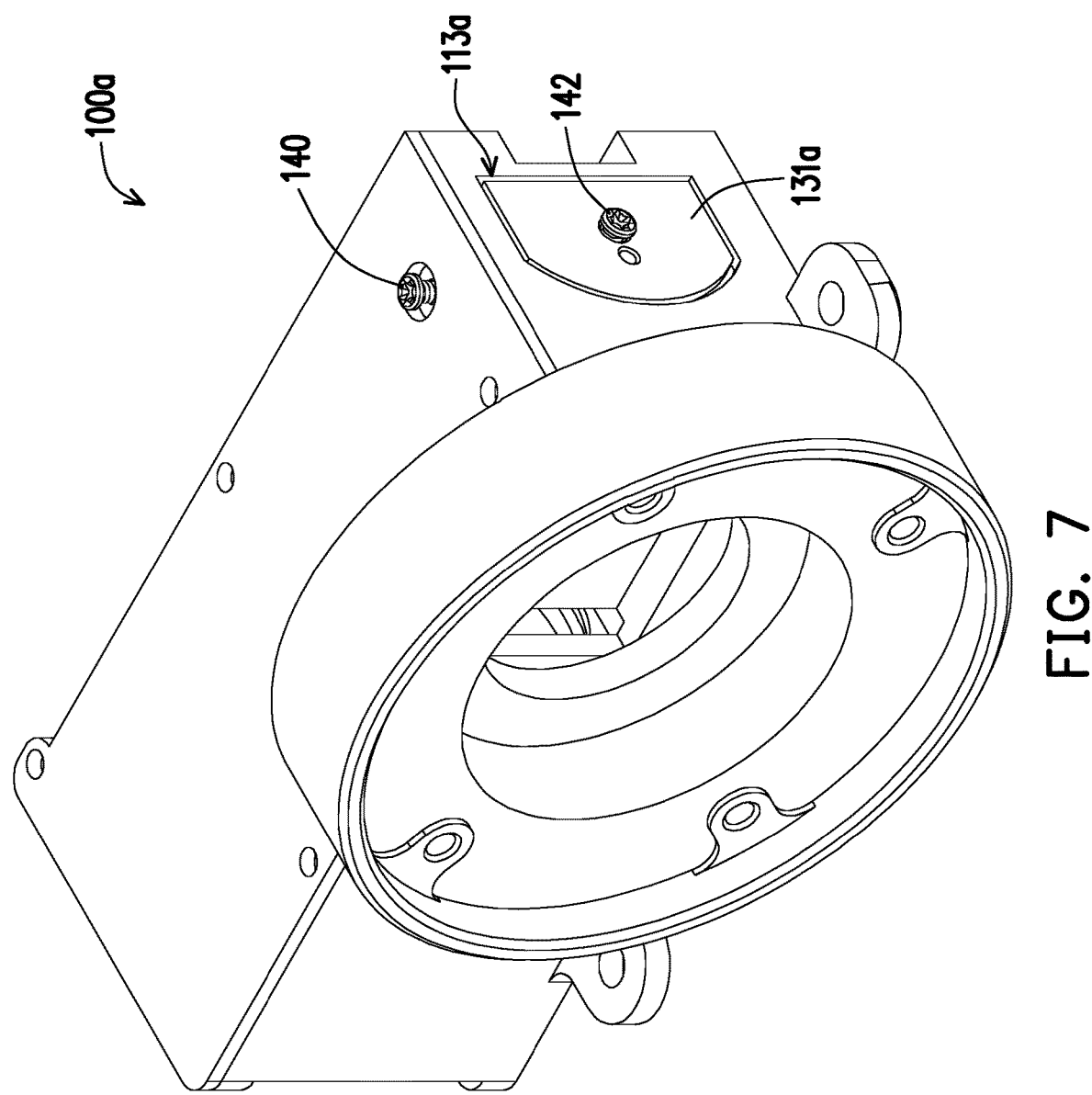
FIG. 7 is a schematic view of an adjustable optical module according to another embodiment of the invention.
Figure 8A:
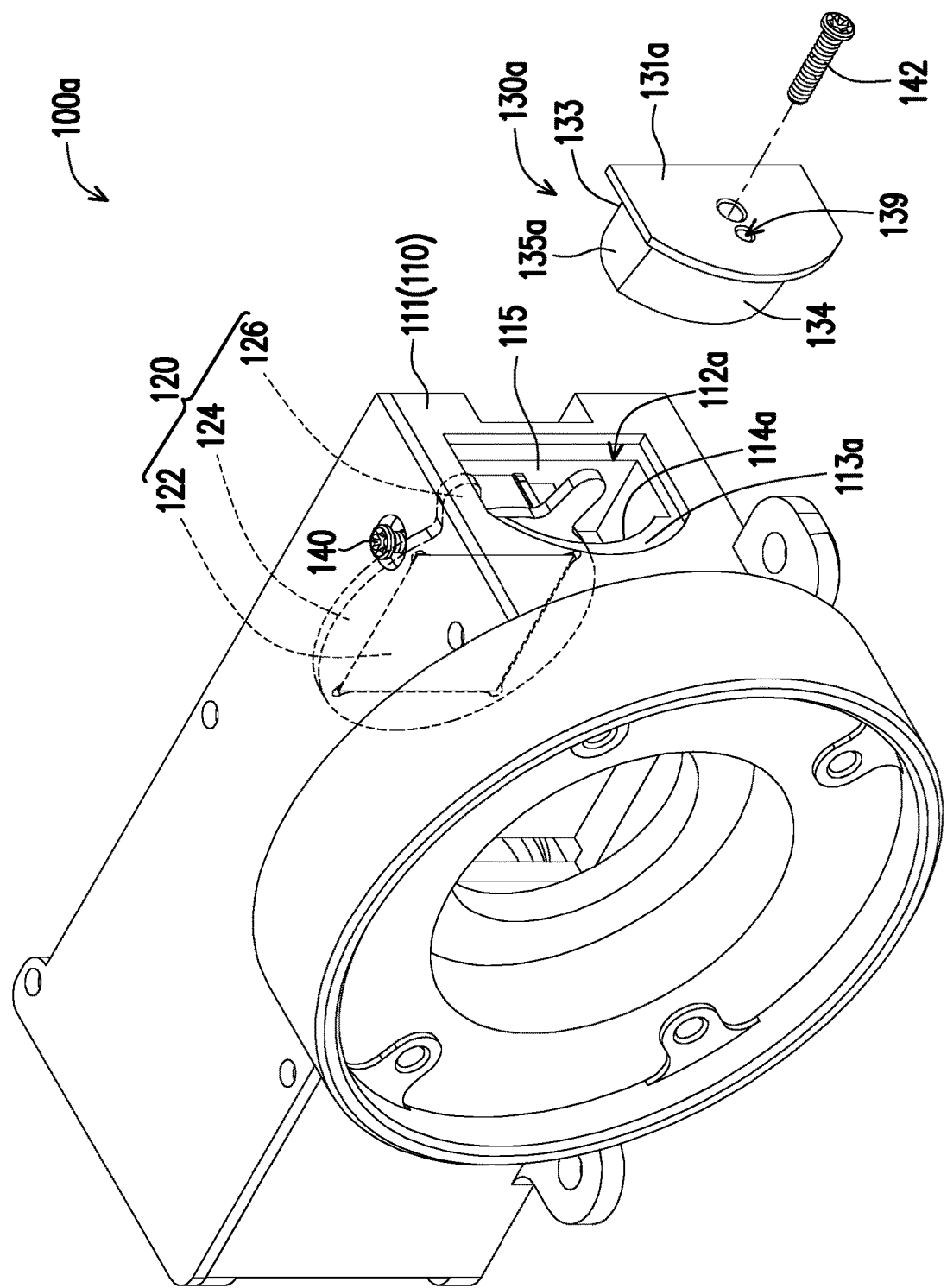
FIG. 8A is a schematic view of removing the cover component of the adjustable optical module of FIG. 7.
Figure 8B:
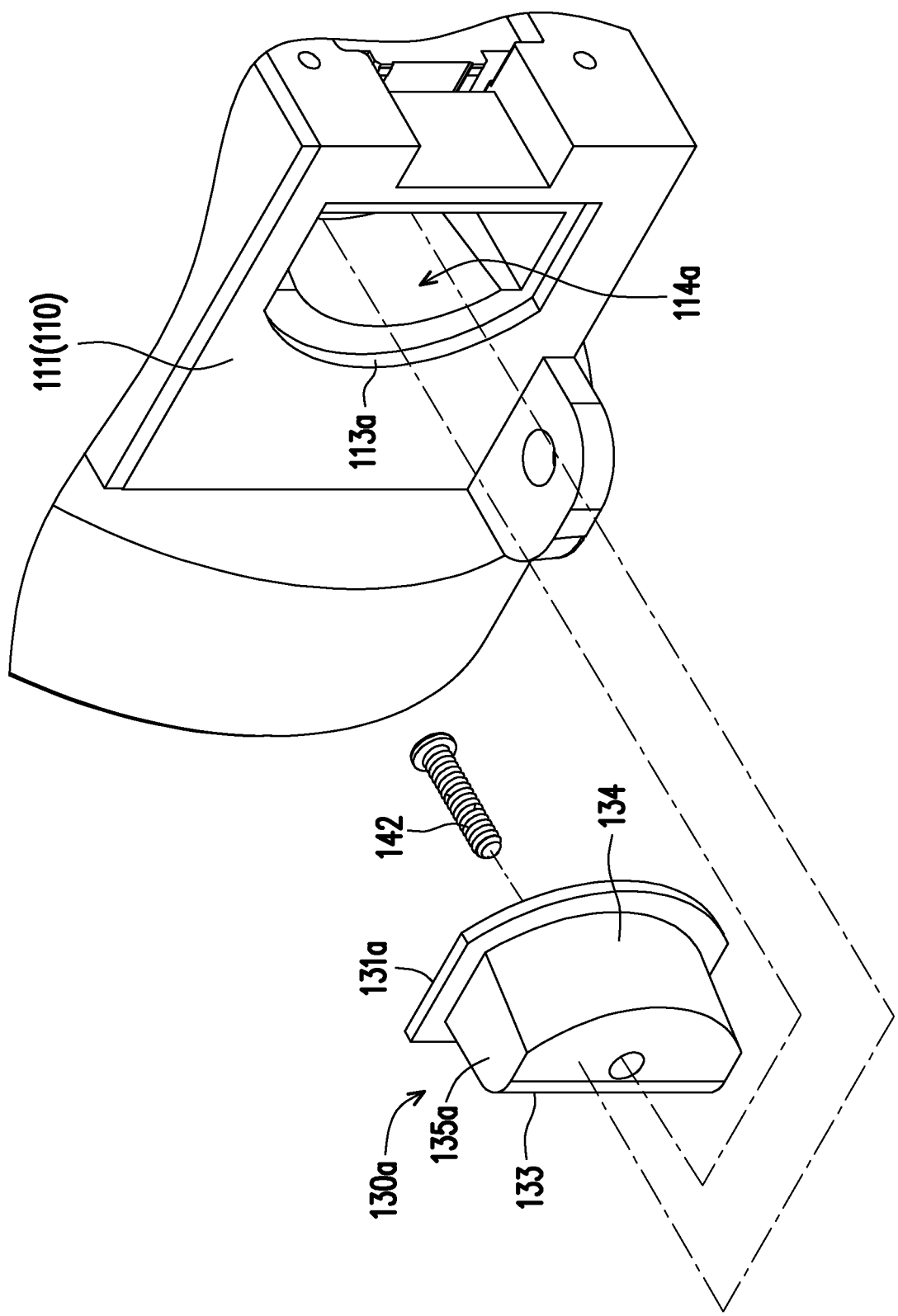
FIG. 8B is a partial schematic view of FIG. 8A from another perspective.

FIG. 7 is a schematic view of an adjustable optical module according to another embodiment of the invention. FIG. 8A is a schematic view of removing the cover component of the adjustable optical module of FIG. 7. FIG. 8B is a partial schematic view of FIG. 8A from another perspective.

Referring to FIG. 7 and FIG. 8A, in this embodiment, a housing 110 of an adjustable optical module 100a includes a frame portion 113a and an opening 112a. An inner sidewall of the opening 112a has a partially tapered surface 114a and a first vertical surface 115 opposite to the partially tapered surface 114a. The partially tapered surface 114a is tapered inwardly from an outside of the opening 112a. A cover plate 131a of a cover component 130a has a contour corresponding to the frame portion 113a. A pressing portion 135a of the cover component 130a has a partially curved surface 134 corresponding to the partially tapered surface 114a and a second vertical surface 133 opposite to the partially curved surface 134. The partially curved surface 134 is a part of an arc. A shape of the partially curved surface 134 is substantially corresponding to a shape of the partially tapered surface 114a. A size of the frame portion 113a is greater than a size of the cover plate 131a.

In this embodiment, during a process of installing the cover component 130a to the housing 110 along an axis direction of the opening 112a, the partially curved surface 134 of the pressing portion 135a is moved along the partially tapered surface 114a of the inner sidewall of the opening 112a and the second vertical surface 133 of the pressing portion 135a is gradually moved close to the first vertical surface 115 of the inner sidewall of the opening 112a so the pressing portion 135 presses against the adjusting lever 126. Then, the cover component 130 is fixed to the housing 110 through fixing pieces 140 and 142.

It is worth noting that, since the partially curved surface 134 of the pressing portion 135a abuts against the partially tapered surface 114a of the inner sidewall of the opening 112a, during the process of locking the fixing piece 140 downwardly from the top, the lower half of the partial tapered surface 114a of the inner sidewall of the opening 112a will support the pressing portion 135a so the cover component 130a can maintain its position without being pushed down by the downwardly screwed fixing piece 140. Accordingly, the position of the optical component 120 cannot be affected. Similarly, during the process of locking the fixing piece 142, the lower half of the partial tapered surface 114a of the inner sidewall of the opening 112a will support the pressing portion 135a so the cover component 130a can maintain its position without being pushed down. Accordingly, the position of the optical component 120 cannot be affected.

Further, as can be seen from FIG. 7, in this embodiment, the cover plate 131a of the cover component 130a further includes a cover removal screw hole 139. When the user intends to remove the cover component 130a from the housing 110, the user can screw a screw (not illustrated) for removing the cover component 130a into the cover removal screw hole 139 to serve as a handle to facilitate pulling out the cover component 130a. Naturally, this design can also be applied to the previous embodiment.

In summary, the optical component of the adjustable optical module of the invention is detachably disposed in the positioning slot of the housing, and the carrying base of the optical component includes the adjusting lever corresponding to the opening of the housing. The operator can turn the adjusting lever to adjust the angle of the optical film so that the angle of the optical film can meet the requirements. In addition, after the angle of the optical film is adjusted, the cover component presses against the adjusting lever to fix the optical film so the optical film can be maintained at a specific angle. As a result, the adjustable optical module of the invention can allow the passed light to have better optical effects.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An adjustable optical module, wherein the adjustable optical module comprises a housing, an optical component and a cover component, wherein:
   the housing has a positioning slot and an opening;
   the optical component is detachably disposed on the positioning slot and comprises an optical film and a carrying base for carrying the optical film, wherein the carrying base comprises an adjusting lever corresponding to the opening, and the adjusting lever is adapted to adjust an angle of the optical film; and
   the cover component is fixed on the housing and covers the opening, and the cover component presses against the adjusting lever to fix the optical film.

2. The adjustable optical module of claim 1, wherein the cover component comprises a cover plate and a pressing portion protruding from the cover plate, the cover plate and the pressing portion are wedge-shaped, the housing comprises a wedge-shaped frame, the opening is located in the wedge-shaped frame, the cover plate is fixed on the wedge-shaped frame and covers the opening, and a size of the wedge-shaped frame is greater than a size of the cover plate.

3. The adjustable optical module of claim 2, wherein an inner sidewall of the opening has a first inclined surface and a first vertical surface opposite to the first inclined surface, the pressing portion has a second inclined surface corresponding to the first inclined surface and a second vertical surface opposite to the second inclined surface, and during a process of installing the cover component to the housing along an axis direction of the opening, the second inclined surface of the pressing portion is adapted to move along the first inclined surface of the inner sidewall of the opening, and the second vertical surface of the pressing portion is gradually moved close to the first vertical surface of the inner sidewall of the opening so the pressing portion presses against the adjusting lever.

4. The adjustable optical module of claim 2, wherein the pressing portion has an arc chamfer close to the optical component.

5. The adjustable optical module of claim 1, further comprising:
   at least one fixing piece, adapted to fix the cover component on the housing.

6. The adjustable optical module of claim 5, wherein the at least one fixing piece is screwed into the housing and presses against the cover component.

7. The adjustable optical module of claim 5, wherein the cover component has a concave hole, and the at least one fixing piece is screwed into the housing and enters the concave hole to press against the cover component.

8. The adjustable optical module of claim 5, wherein the at least one fixing piece is inserted to the cover component and screwed into the housing.

9. The adjustable optical module of claim 1, wherein the housing comprises a frame portion, the opening is located in the frame portion, an inner sidewall of the opening has a partially tapered surface, the partially tapered surface is tapered inwardly from an outside of the opening, the cover component comprises a cover plate and a pressing portion protruding from the cover, the pressing portion has a partially curved surface corresponding to the partially tapered surface, and the cover plate is fixed on the frame portion and covers the opening.

10. The adjustable optical module of claim 9, wherein the inner sidewall of the opening has a first vertical surface opposite to the partially tapered surface, the pressing portion has a second vertical surface opposite to the partially curved surface, and during a process of installing the cover component to the housing along an axis direction of the opening, the partially curved surface of the pressing portion is moved along the partially tapered surface of the inner sidewall of the opening, and the second vertical surface of the pressing portion is gradually adapted to move close to the first vertical surface of the inner sidewall of the opening so the pressing portion presses against the adjusting lever.

11. The adjustable optical module of claim 1, wherein the optical film comprises a compensation film.

12. The adjustable optical module of claim 1, wherein the cover component comprises a cover plate, and the cover plate has a screw hole for removing the cover component.

13. A projector, wherein the projector comprises a polarized beam splitter, a liquid crystal on silicon and an adjustable optical module, wherein:
   the adjustable optical module is disposed between the polarized beam splitter and the liquid crystal on silicon, and the adjustable optical module comprises a housing, an optical component and a cover component, wherein:

the housing has a positioning slot and an opening;

the optical component is detachably disposed on the positioning slot and comprises an optical film and a carrying base for carrying the optical film, wherein the carrying base comprises an adjusting lever corresponding to the opening, and the adjusting lever is adapted to adjust an angle of the optical film; and the cover component is fixed on the housing and covers the opening, and the cover component presses against the adjusting lever to fix the optical film.

14. The projector of claim 13, wherein the optical film comprises a compensation film.

15. The projector of claim 13, wherein the cover component comprises a cover plate and a pressing portion protruding from the cover plate, the cover plate and the pressing portion are wedge-shaped, the housing comprises a wedge-shaped frame, the opening is located in the wedge-shaped frame, the cover plate is fixed on the wedge-shaped frame and covers the opening, and a size of the wedge-shaped frame is greater than a size of the cover plate.

16. The projector of claim 15, wherein an inner sidewall of the opening has a first inclined surface and a first vertical surface opposite to the first inclined surface, the pressing portion has a second inclined surface corresponding to the first inclined surface and a second vertical surface opposite to the second inclined surface, and during a process of installing the cover component to the housing along an axis direction of the opening, the second inclined surface of the pressing portion is moved along the first inclined surface of the inner sidewall of the opening and the second vertical surface of the pressing portion is gradually adapted to move close to the first vertical surface of the inner sidewall of the opening so the pressing portion presses against the adjusting lever.

17. The projector of claim 15, wherein the pressing portion has an arc chamfer close to the optical component.

18. The projector of claim 13, wherein the adjustable optical module further comprises:

at least one fixing piece, used to fix the cover component on the housing.

19. The projector of claim 18, wherein the at least one fixing piece is screwed into the housing and presses against the cover component.

20. The projector of claim 18, wherein the cover component has a concave hole, and the at least one fixing piece is screwed into the housing and enters the concave hole to press against the cover component.

21. The projector of claim 18, wherein the at least one fixing piece is inserted to the cover component and screwed into the housing.

22. The projector of claim 13, wherein the housing comprises a frame portion, the opening is located in the frame portion, an inner sidewall of the opening has a partially tapered surface, the partially tapered surface is tapered inwardly from an outside of the opening, the cover component comprises a cover plate and a pressing portion protruding from the cover, the pressing portion has a partially curved surface corresponding to the partially tapered surface, and the cover plate is fixed on the frame portion and covers the opening.

23. The projector of claim 22, wherein the inner sidewall of the opening has a first vertical surface opposite to the partially tapered surface, the pressing portion has a second vertical surface opposite to the partially curved surface, and during a process of installing the cover component to the housing along an axis direction of the opening, the partially curved surface of the pressing portion is moved along the partially tapered surface of the inner sidewall of the opening and the second vertical surface of the pressing portion is gradually adapted to move close to the first vertical surface of the inner sidewall of the opening so the pressing portion presses against the adjusting lever.

24. The projector of claim 13, wherein the cover component comprises a cover plate, and the cover plate has a cover removal screw hole.

* * * * *